United States Patent
Chae et al.

(10) Patent No.: US 10,425,937 B2
(45) Date of Patent: Sep. 24, 2019

(54) METHOD AND APPARATUS FOR TRANSMITTING AND RECEIVING SIGNAL BY FULL-DUPLEX BASE STATION IN WIRELESS COMMUNICATION SYSTEM

(71) Applicant: LG ELECTRONICS INC., Seoul (KR)

(72) Inventors: Hyukjin Chae, Seoul (KR); Seungmin Lee, Seoul (KR); Hyunho Lee, Seoul (KR); Bonghoe Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 292 days.

(21) Appl. No.: 15/321,044

(22) PCT Filed: Jun. 22, 2015

(86) PCT No.: PCT/KR2015/006289
§ 371 (c)(1),
(2) Date: Dec. 21, 2016

(87) PCT Pub. No.: WO2015/199391
PCT Pub. Date: Dec. 30, 2015

(65) Prior Publication Data
US 2017/0201986 A1   Jul. 13, 2017

Related U.S. Application Data

(60) Provisional application No. 62/015,509, filed on Jun. 22, 2014.

(51) Int. Cl.
*H04W 72/04* (2009.01)
*H04B 7/26* (2006.01)
(Continued)

(52) U.S. Cl.
CPC ...... *H04W 72/0446* (2013.01); *H04B 7/0456* (2013.01); *H04B 7/0617* (2013.01); *H04B 7/26* (2013.01); *H04L 5/14* (2013.01)

(58) Field of Classification Search
None
See application file for complete search history.

(56) References Cited

U.S. PATENT DOCUMENTS

| 5,606,727 A * | 2/1997 | Ueda | ............ H04W 72/082 455/513 |
| 7,480,271 B2 * | 1/2009 | Guo | ............ H04L 5/0041 370/329 |

(Continued)

OTHER PUBLICATIONS

Kneckt et al., "Utilizing Unused Resources by Allowing Simultaneous Transmissions," IEEE 11-14/0357r0, Mar. 17, 2014 (downloaded on Mar. 16, 2014), pp. 2-14.

*Primary Examiner* — Andrew C Oh
(74) *Attorney, Agent, or Firm* — Birch, Stewart, Kolasch & Birch, LLP

(57) ABSTRACT

An embodiment of the present invention relates to a method for transmitting and receiving a signal by an inband full duplex (IBFD) base station in a wireless communication system, comprising the steps of: receiving respective uplink signals that repeat K times in K time intervals; and transmitting K-N downlink signals in K-N time intervals while the uplink signals are received in the K time intervals, wherein the N time intervals in the K time intervals are used for handling interference received by one or more terminals receiving the downlink signals from one or more terminals transmitting the uplink signals.

11 Claims, 12 Drawing Sheets

(51) Int. Cl.
*H04B 7/0456* (2017.01)
*H04L 5/14* (2006.01)
*H04B 7/06* (2006.01)

(56) References Cited

U.S. PATENT DOCUMENTS

| | | | | |
|---|---|---|---|---|
| 9,154,287 | B1* | 10/2015 | Cummings, III | H04L 5/1469 |
| 9,413,516 | B2* | 8/2016 | Khandani | H04B 1/525 |
| 2001/0046867 | A1* | 11/2001 | Mizoguchi | H04B 7/005 |
| | | | | 455/452.2 |
| 2002/0168941 | A1* | 11/2002 | Uesugi | H04B 7/08 |
| | | | | 455/63.1 |
| 2007/0274372 | A1* | 11/2007 | Asai | H04B 1/525 |
| | | | | 375/130 |
| 2008/0008126 | A1* | 1/2008 | Shirakabe | H04B 7/2615 |
| | | | | 370/329 |
| 2008/0268859 | A1* | 10/2008 | Lee | H04W 72/0426 |
| | | | | 455/450 |
| 2009/0280866 | A1* | 11/2009 | Lo | H01Q 1/246 |
| | | | | 455/562.1 |
| 2010/0022201 | A1 | 1/2010 | Vandenameele | |
| 2011/0211543 | A1* | 9/2011 | Frederiksen | H04W 72/0426 |
| | | | | 370/329 |
| 2011/0237243 | A1* | 9/2011 | Guvenc | H04L 5/0032 |
| | | | | 455/423 |
| 2012/0082256 | A1* | 4/2012 | Gaur | H04B 7/0426 |
| | | | | 375/260 |
| 2012/0155336 | A1 | 6/2012 | Khojastepour et al. | |
| 2012/0282889 | A1* | 11/2012 | Tanaka | H04J 11/0053 |
| | | | | 455/405 |
| 2013/0083672 | A1 | 4/2013 | Johansson et al. | |
| 2013/0115984 | A1* | 5/2013 | Schmidt | H04W 16/14 |
| | | | | 455/501 |
| 2013/0188530 | A1 | 7/2013 | Pirskanen et al. | |
| 2013/0286873 | A1* | 10/2013 | Wilkinson | H04W 72/1226 |
| | | | | 370/252 |
| 2013/0294268 | A1* | 11/2013 | Xu | H04W 72/082 |
| | | | | 370/252 |
| 2013/0294296 | A1* | 11/2013 | Dimou | H04W 72/082 |
| | | | | 370/280 |
| 2013/0308503 | A1* | 11/2013 | Kim | H04L 5/0053 |
| | | | | 370/280 |
| 2013/0315115 | A1* | 11/2013 | Kim | H04J 11/0056 |
| | | | | 370/280 |
| 2014/0023001 | A1* | 1/2014 | Huang | H04W 24/02 |
| | | | | 370/329 |
| 2014/0118196 | A1* | 5/2014 | Koskiniemi | H01Q 1/42 |
| | | | | 343/702 |
| 2014/0133412 | A1* | 5/2014 | Jeniston Deviraj | H04W 72/12 |
| | | | | 370/329 |
| 2014/0177606 | A1* | 6/2014 | Bitran | H04W 72/0446 |
| | | | | 370/336 |
| 2014/0192759 | A1* | 7/2014 | Son | H04W 72/0426 |
| | | | | 370/329 |
| 2014/0211689 | A1* | 7/2014 | Ashikhmin | H04B 7/024 |
| | | | | 370/328 |
| 2014/0335879 | A1* | 11/2014 | Immendorf | H04W 72/082 |
| | | | | 455/452.1 |
| 2014/0362732 | A1* | 12/2014 | Landstrom | H04L 25/0226 |
| | | | | 370/254 |
| 2014/0362956 | A1* | 12/2014 | Zhang | H04B 1/71072 |
| | | | | 375/346 |
| 2015/0049683 | A1* | 2/2015 | Barbieri | H04L 5/005 |
| | | | | 370/329 |
| 2015/0049792 | A1* | 2/2015 | Han | H04L 25/03012 |
| | | | | 375/219 |
| 2015/0078281 | A1* | 3/2015 | Kishiyama | H04L 5/0048 |
| | | | | 370/329 |
| 2015/0092873 | A1* | 4/2015 | Ashikhmin | H04B 7/0456 |
| | | | | 375/267 |
| 2015/0103775 | A1* | 4/2015 | Zhu | H04L 1/1822 |
| | | | | 370/329 |
| 2015/0110025 | A1* | 4/2015 | Chae | H04B 7/024 |
| | | | | 370/329 |
| 2015/0257130 | A1* | 9/2015 | Lee | H04W 72/042 |
| | | | | 370/336 |
| 2015/0280887 | A1* | 10/2015 | Ko | H04B 1/525 |
| | | | | 370/330 |
| 2015/0304016 | A1* | 10/2015 | Choi | H04B 7/15 |
| | | | | 455/11.1 |
| 2015/0312081 | A1* | 10/2015 | Yang | H04B 1/38 |
| | | | | 375/298 |
| 2015/0341814 | A1* | 11/2015 | Yu | H04B 7/04 |
| | | | | 370/252 |
| 2016/0006529 | A1* | 1/2016 | Yi | H04J 11/0056 |
| | | | | 370/329 |
| 2016/0081093 | A1* | 3/2016 | Hugl | H04J 11/005 |
| | | | | 370/329 |
| 2016/0143017 | A1* | 5/2016 | Yang | H04L 1/1812 |
| | | | | 370/329 |
| 2016/0165640 | A1* | 6/2016 | Yang | H04W 74/08 |
| | | | | 370/336 |
| 2016/0197690 | A1* | 7/2016 | Li | H04L 25/0224 |
| | | | | 370/278 |
| 2016/0226534 | A1* | 8/2016 | Suzuki | H04L 5/0073 |
| 2017/0086224 | A1* | 3/2017 | Wilhelmsson | H04W 72/121 |
| 2017/0201986 | A1* | 7/2017 | Chae | H04B 7/26 |

* cited by examiner

FIG. 5
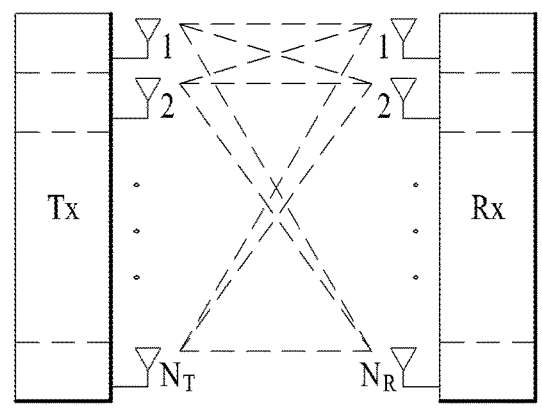
(a)
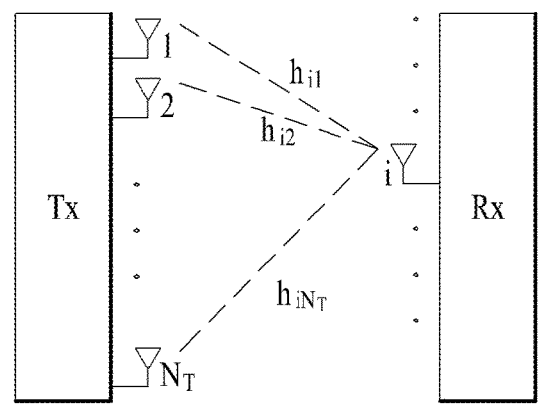
(b)

M=4, K=15, Rcell=200m

METHOD AND APPARATUS FOR TRANSMITTING AND RECEIVING SIGNAL BY FULL-DUPLEX BASE STATION IN WIRELESS COMMUNICATION SYSTEM

CROSS REFERENCE TO RELATED APPLICATIONS

This application is the National Phase of PCT/KR2015/006289 filed on Jun. 22, 2015, which claims priority under 35 U.S.C. § 119(e) to U.S. Provisional Application No. 62/015,509 filed on Jun. 22, 2014, all of which are hereby expressly incorporated by reference into the present application.

TECHNICAL FIELD

The present invention relates to a wireless communication system, and more particularly, to a method and apparatus for transmitting and receiving signals in full duplex communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE OF THE INVENTION

Technical Task

The technical task of the present invention is to provide a signal transmitting and receiving method for a full duplex base station and a signal transmitting and receiving method for a user equipment.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided is a method of transmitting and receiving signals by an IBFD (inband full duplex) base station in a wireless communication system, including: receiving uplink signals, which are repeated K times, in K time intervals, respectively; and transmitting (K-N) downlink signals in (K-N) time intervals while receiving the uplink signals in the K time intervals, wherein among the K time intervals, the N time intervals are used for handing interference, which one or more user equipments that transmit the uplink signals cause to one or more user equipments that receive the downlink signals.

In another technical aspect of the present invention, provided is a base station apparatus in a wireless communication system, including: a receiving module; and a processor, wherein the processor is configured to respectively receive uplink signals repeated K times in K time intervals and transmit (K-N) downlink signals in (K-N) time intervals while receiving the uplink signals in the K time intervals, and wherein among the K time intervals, the N time intervals are used for handing interference, which one or more user equipments that transmit the uplink signals cause to one or more user equipments that receive the downlink signals.

The interference handling may be performed in such a manner that the one or more user equipments that receive the downlink signals eliminate signal components received in the N time intervals when decoding the (K-N) downlink signals.

In case N=1 and the downlink signals are expressed as follows:

$$y_k^D(n) = h_k^T w_k d_k(n) + \sum_{l=1}^{Nu} g_{k,l} u_l(n) + z_k(n), \ 1 \leq n \leq K-1,$$

the interference handling may be expressed as follows:

$$y_k^D(n) = h_k^T w_k d_k(n) + \sum_{l=1}^{Nu} g_{k,l} u_l(n) + z_k(n) - \sum_{l=1}^{Nu} g_{k,l} u_l(K), \ 1 \leq n \leq K-1,$$

where $h_k^T$ indicates an 1×M downlink channel matrix from the base station to an $k^{th}$ user equipment, $w_k$ indicates an M×1 precoding matrix for the $k^{th}$ user equipment, $d_k$ indicates a transmission symbol of an $k^{th}$ user, $g_{k,l}$ indicates an 1×1 channel from an $l^{th}$ uplink signal transmission user equipment to an $k^{th}$ downlink signal reception user equipment, $z_k$ indicates a noise signal of the $k^{th}$ user equipment, $N_D$ indicates the number of users that are simultaneously supported in downlink, and $N_U$ indicates the number of users that are simultaneously supported in uplink.

When the uplink signals repeated K times are received, a different channel may be used in each of the K time interval.

When the base station has K predetermined antenna modes, the K antenna modes may be respectively applied to the K time intervals.

The base station may assume that channel states are not changed in the K time intervals.

When channel states are changed in the K time intervals, the N time intervals may be located at a center of the K time intervals.

The N time intervals may be located at an end of the K time intervals.

The time interval may correspond to any one of an OFDM symbol, a slot, and a subframe.

The number of the user equipments that receive the downlink signals may be K.

The base station may include a reconfigurable antenna.

Advantageous Effects

According to embodiments of the present invention, impact of interference between user equipments (UE-to-UE interference) can be minimized and full duplex communication can also be achieved.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram illustrating a configuration of a wireless communication system having multiple antennas.

BEST MODE FOR INVENTION

Figure 1:
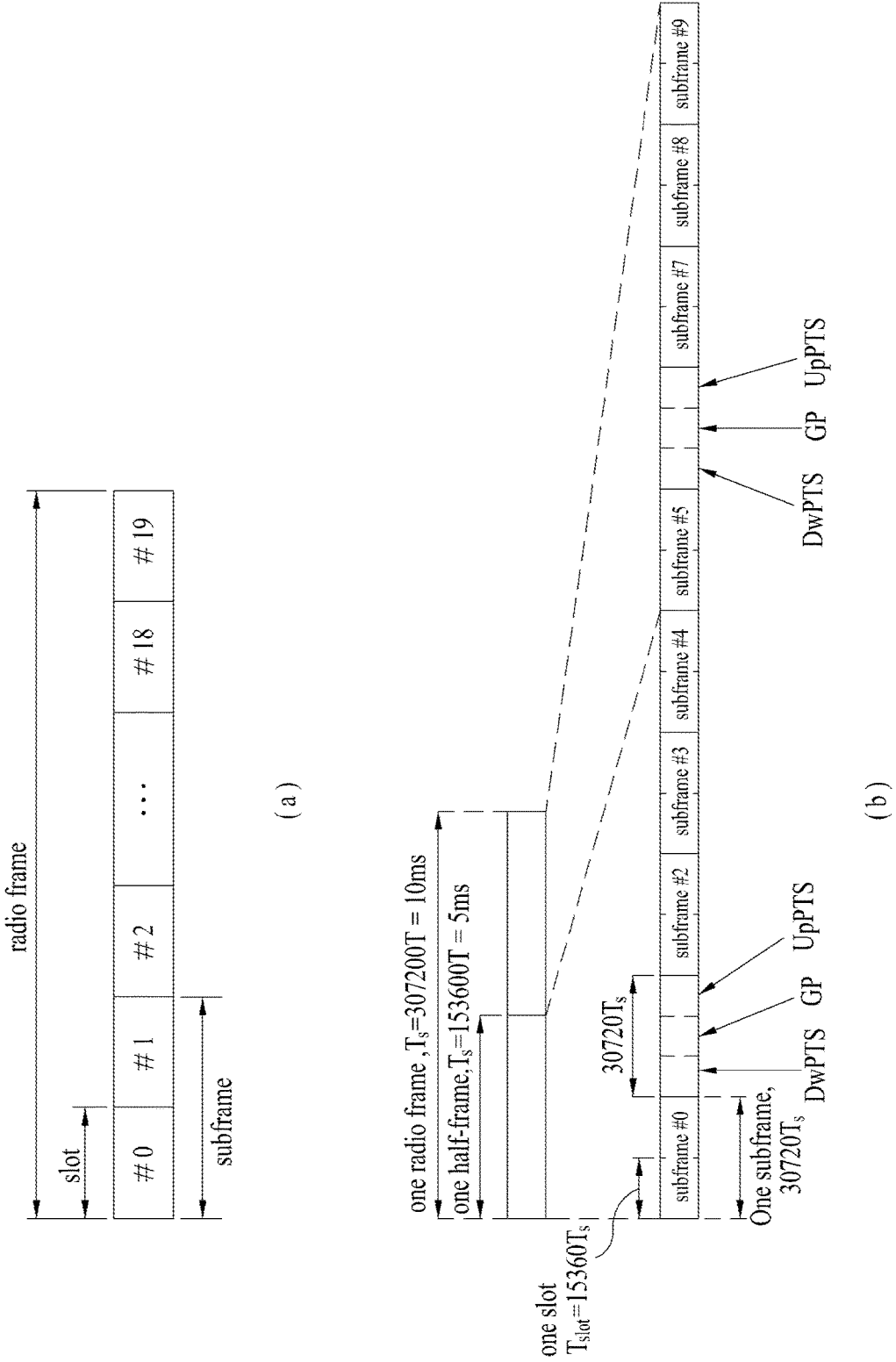
FIG. 1 is a diagram illustrating a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
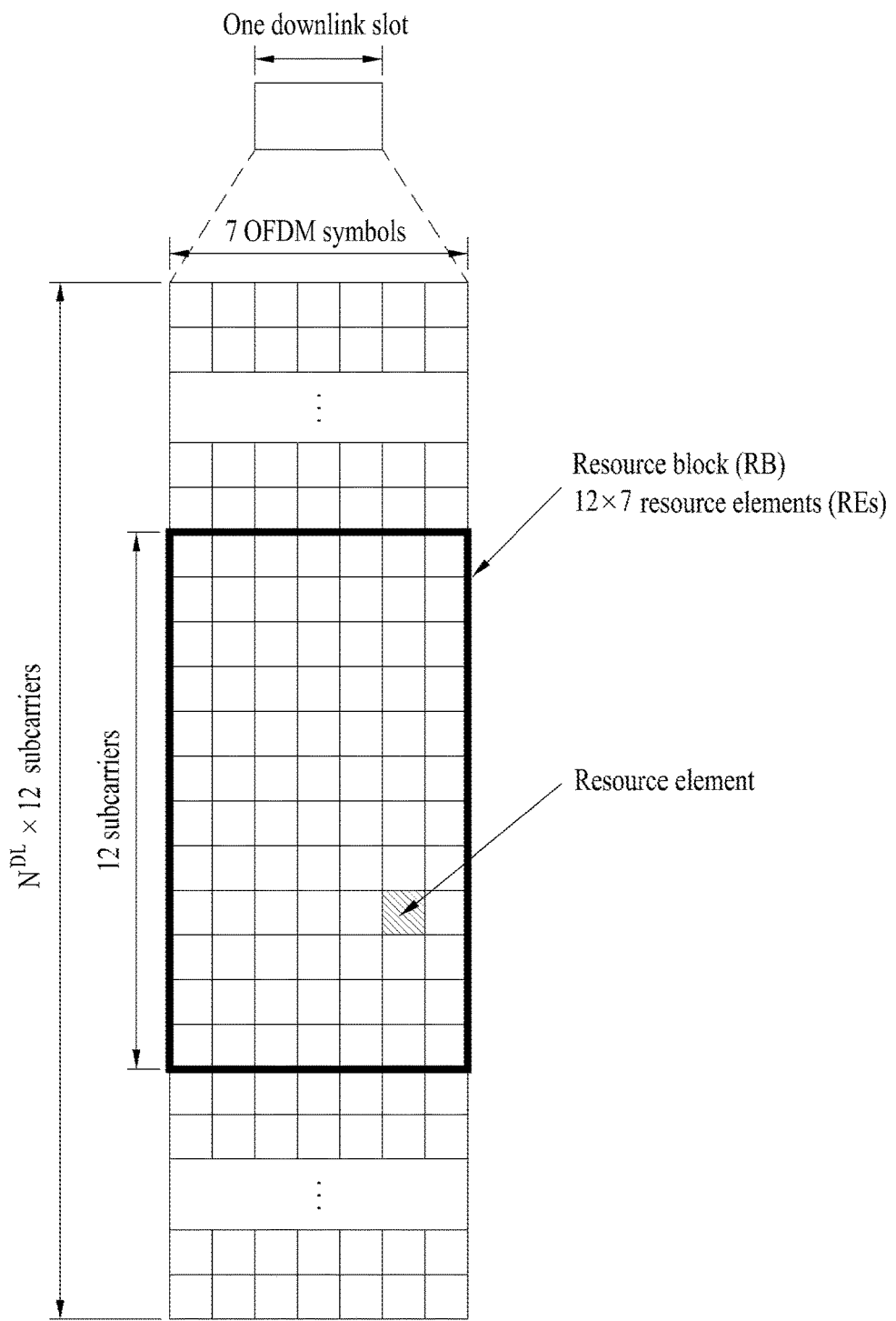
FIG. 2 is a diagram illustrating a resource grid of a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
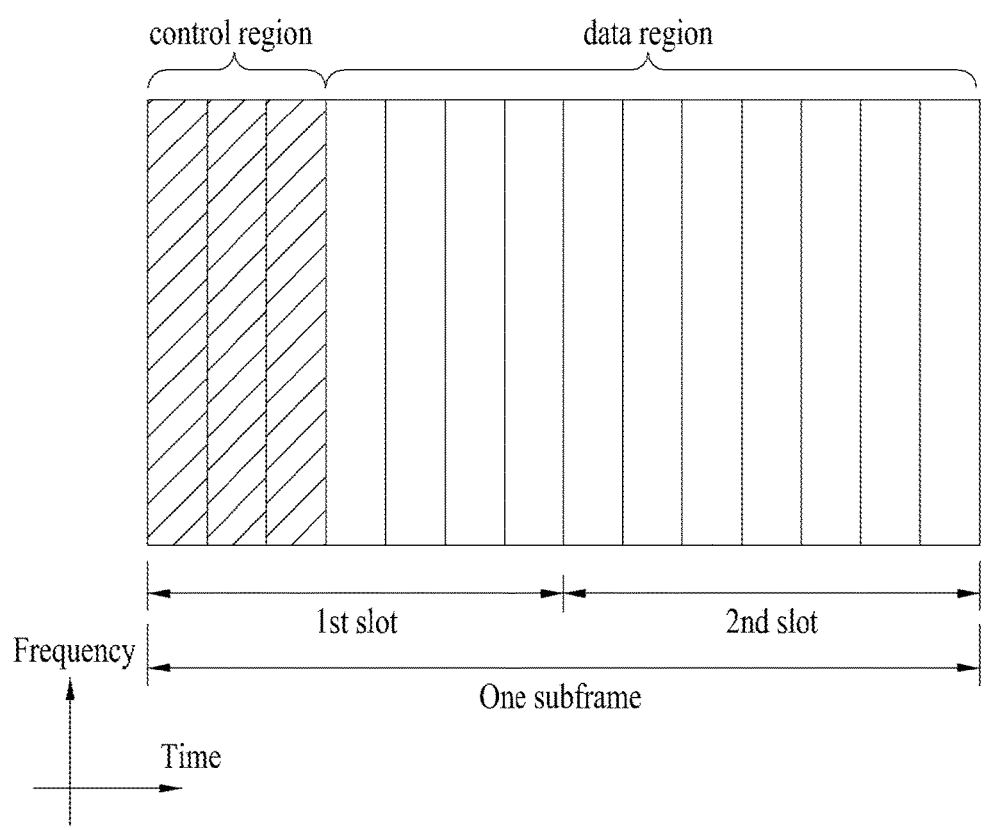
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
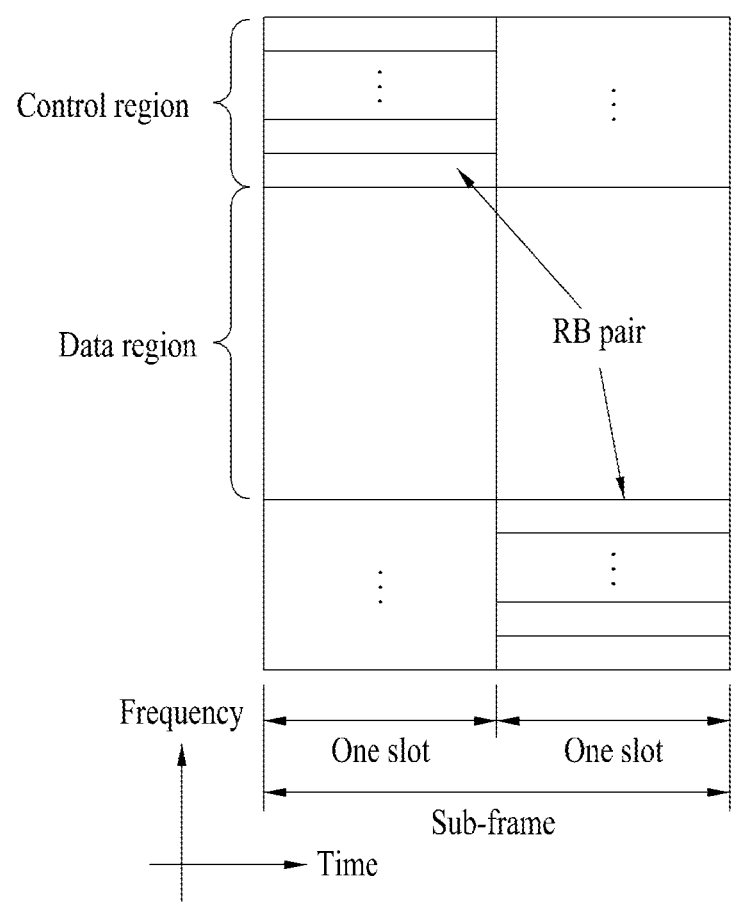
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of Multiple Input Multiple Output (MIMO) System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots n_{N_R}$ respectively added to the NR receive antennas can be expressed as follows.

$$n = [n_1, n_2, \ldots n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \quad \text{[Equation 10]}$$

$$\begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$rank(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this specification, 'rank' in the MIMO transmission represents the number of paths through which signals can be independently transmitted on a specific frequency resource at a specific time and 'the number of layers' refers to the number of signal streams transmitted through each path. Since a transmitter transmits as many layers as the number of ranks used for signal transmission, the rank corresponds to the number of layers unless otherwise mentioned.

Carrier Aggregation

Figure 6:
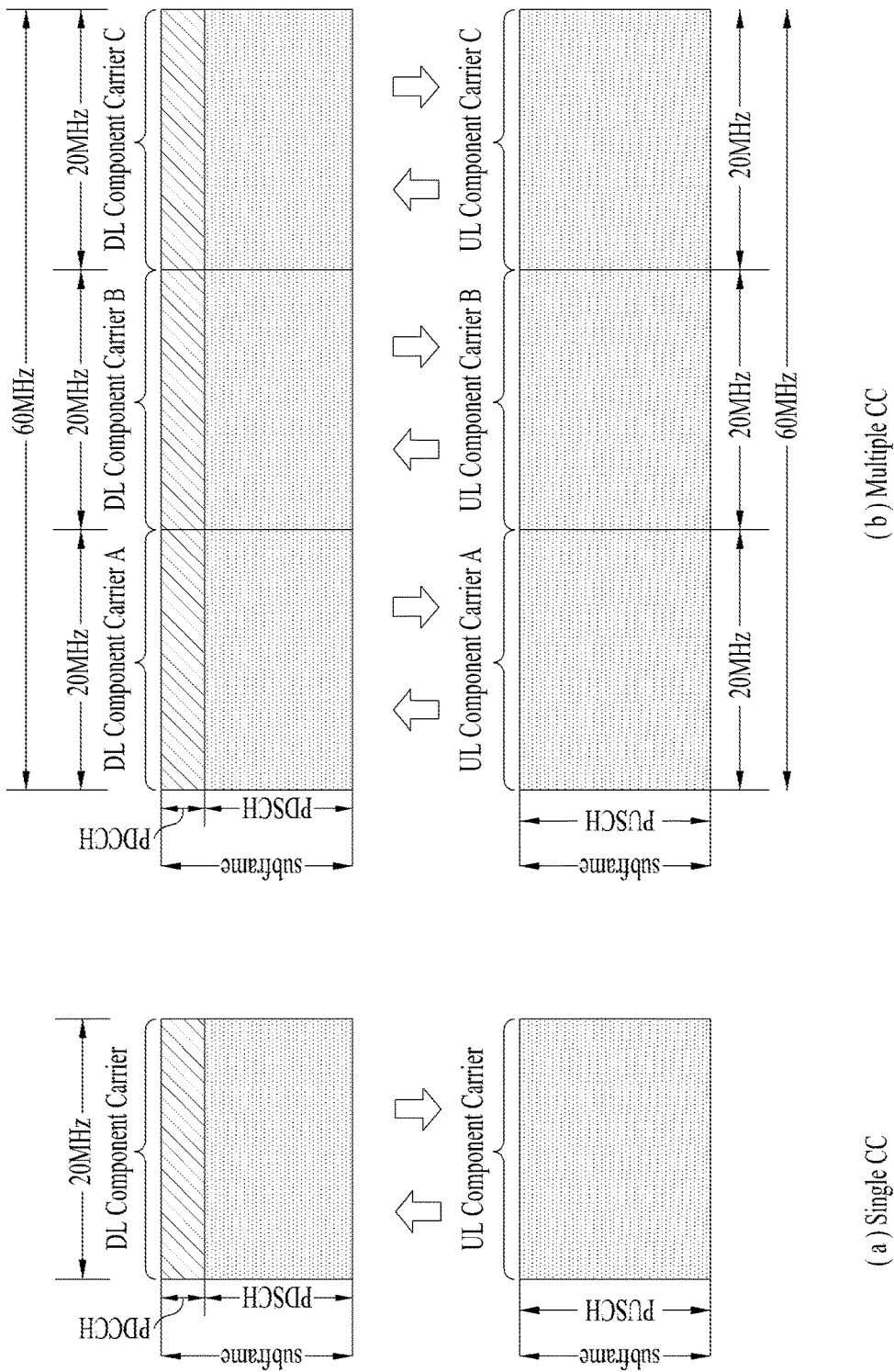
FIGS. 6 and 7 are diagrams for explaining carrier aggregation.

FIG. 6 is a diagram to describe carrier aggregation. Prior to describing carrier aggregation, the concept of a cell introduced to manage and control a radio resource in the LTE-A is described as follows. First of all, a cell can be understood as combination of a DL resource and a UL resource. In this case, the UL resource is not an essential element. Hence, a cell can be configured with a DL resource only or both a DL resource and a UL resource. This is the current definition by LTE-A Release 10. On the contrary, a cell can be configured with a UL resource only. A DL resource can be named a DL component carrier (DL CC) and a UL resource can be named a UL component carrier (UL CC). DL CC and UL CC can be represented as carrier frequency. And, the carrier frequency means a center frequency in a corresponding cell.

Cells can be classified into a primary cell (PCell) operating on a primary frequency and a secondary cell (SCell) operating on a secondary frequency. The PCell and SCell can be commonly named a serving cell. The cell, which is indicated when a UE performs an initial connection establishment process, a connection re-establishment process or a handover process, can become the PCell. That is, the PCell can be understood as a cell that becomes a control related center in a carrier aggregation environment that will be described later. A UE can receive assignment of a PUCCH in its PCell and then transmit the PUCCH. The SCell can be configured after completion of RRC (radio resource control) connection establishment and may be used to provide an additional radio resource. In the carrier aggregation environment, a serving cell except the PCell may be regarded as the SCell. If carrier aggregation is not configured for a UE in RRC_CONNECTED state or a UE in RRC_CONNECTED state does not support carrier aggregation, there may be a single serving cell configured with the PCell only. On the other hand, if carrier aggregation is configured for a UE in RRC_CONNECTED state, at least one or more serving cells may exist. And, PCell and all SCells are included in the entire serving cells. For a UE that supports carrier aggregation, a network can configure at least one SCell in addition to PCell initially configured in the connection establishment process after initiation of an initial security activation process.

Hereinafter, carrier aggregation is explained with reference to FIG. 6. First of all, carrier aggregation is the technology introduced to enable a wider band to be used in order to meet the demand for a high and fast transmission rate. Carrier aggregation may be defined as an aggregation of at least two component carriers (CCs) differing from each other in carrier frequency. Referring to FIG. 6, FIG. 6(*a*) shows a subframe in case that a single CC is used in a legacy LTE system and FIG. 6(*b*) shows a subframe in case of using carrier aggregation. FIG. 6(*b*) shows one example that 3 CCs on 20 MHz are used to support a bandwidth of total 60 MHz. In this case, the CCs may be contiguous or non-contiguous.

A UE can simultaneously receive and monitor DL data through a plurality of DL CCs. A linkage between each DL CC and UL CC can be indicated by system information. DL CC/UL CC link may be fixed to a system or configured semi-statically. Moreover, even if a full system band is configured with N CCs, a frequency band which can be monitored/received by a specific US may be limited to M (<N) CCs. Various parameters for carrier aggregation may be set by a cell-specific, UE group-specific or UE-specific method.

Figure 7:
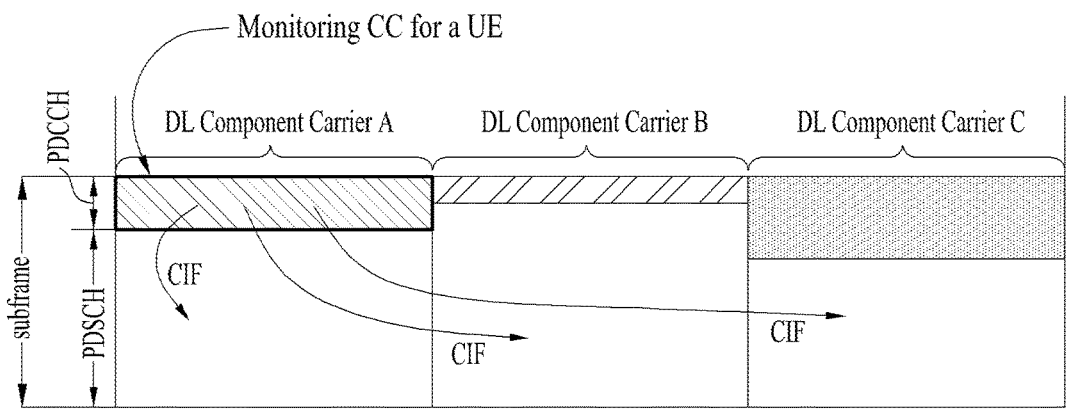

FIG. 7 is a diagram to describe cross carrier scheduling. First of all, cross carrier scheduling means that a control region of DL CC of one of a plurality of serving cells includes all DL scheduling assignment information of another DL CC or that a control region of DL CC of one of a plurality of serving cells includes all UL scheduling grant information on a plurality of DL CCs linked to the corresponding DL CC.

First of all, a carrier indicator field (CIF) will be described in detail.

As described above, the CIF may either be included or not included in the DCI format, which is being transmitted through the PDCCH. And, in case the CIF is included in the DCI format, this indicates that cross-carrier scheduling is applied. In case cross-carrier scheduling is not applied, the downlink scheduling allocation information is valid within the DL CC through which current downlink scheduling allocation information is being transmitted. Additionally, the uplink scheduling authorization is valid for a UL CC, which is linked to the DL CC through which the downlink scheduling allocation information is being transmitted.

In case cross-carrier scheduling is being applied, the CIF indicates a CC related to the downlink scheduling allocation information, which is transmitted through the PDCCH from any one DL CC. For example, referring to FIG. 7, downlink allocation information, i.e., information on PDSCH resource, respective to DL CC B and DL CC C is transmitted through the PDCCH within the control region of DL CC A.

The UE may monitor DL CC A, so as to figure out the resource area of the PDSCH and the corresponding CC through the CIF.

Whether the CIF is included or not included in the PDCCH may be configured semi-statically, and the CIF may be UE-specifically activated (or enabled) by higher layer signaling. In case the CIF is disabled, the PDCCH of a specific DL CC allocates PDSCH resource of the same DL CC and may also allocate PUSCH resource of a UL CC, which is linked to the specific DL CC. In this case, the same coding method, CCE based resource mapping, DCI format, and the like, as the conventional PDCCH structure may be applied.

Meanwhile, in case the CIF is enabled, the PDCCH of a specific DL CC may allocate PDSCH/PUSCH resource within a single DL/UL CC being indicated by the CIF, among the multiple aggregated CCs. In this case, a CIF may be additionally defined in the conventional PDCCH DCI format, and the CIF may be defined as a field having a fixed length of 3 bits, or the CIF position may be fixed regardless of the DCI format size. In this case also, the same coding method, CCE based resource mapping, DCI format, and so on, as the conventional PDCCH structure may be applied.

In case the CIF exists, the BS may allocation a DL CC set, which is intended to monitor the PDCCH. Accordingly, the burden of blind decoding of the UE may be decreased. The PDCCH monitoring CC set corresponds to a portion of the entire aggregated DL CC, and the UE may perform PDCCH detection/decoding only in the corresponding CC set. More specifically, in order to perform PDSCH/PUSCH scheduling with respect to the UE, the BS may transmit the PDCCH only over the PDCCH monitoring CC set. The PDCCH monitoring CC set may be UE-specifically or UE group-specifically or cell-specifically set up. For example, as shown in the example of FIG. 7, when 3 DL CCs are aggregated, DL CC A may be set up as the PDCCH monitoring DL CC. In case the CIF is disabled, the PDCCH of each DL CC may schedule only the PDSCH within the DL CC A. Meanwhile, when the CIF is enabled, in addition to the DL CC A, the PDCCH of DL CC A may also schedule the PDSCH of other DL CCs. In case the DL CC A is set up as the PDCCH monitoring CC, the PDSCCH is not transmitted to DL CC B and the DL CC C.

In a system to which the aforementioned carrier aggregation is applied, a UE can receive a plurality of PDSCHs on a plurality of DL carriers. In this case, there may exist a case that the UE transmits ACK/NACK for each data on a single UL CC in one subframe. In case of transmitting a plurality of ACK/NACK in one subframe using PUCCH format 1a/1b, higher transmit power is required, PAPR of a UL transmission is increased, and a distance capable of being transmitted by the UE to an eNode B may be decreased due to an inefficient use of a transmit power amplifier. ACK/NACK bundling or ACK/NACK multiplexing can be applied to transmit a plurality of the ACK/NACK on one PUCCH.

Additionally, there may occur a case when ACK/NACK information respective to a large number of downlink data sets according to the application of carrier aggregation and/or ACK/NACK information respective to a large number of downlink data sets being transmitted from a plurality of DL subframes in a TDD system is required to be transmitted through the PUCCH in a single subframe. In such case, if the number if ACK/NACK bits that are to be transmitted is larger than the number of bits available for support through ACK/NACK bundling or multiplexing, the ACK/NACK information may not be correctly transmitted by using the above-described methods.

Based on the above discussion, (inband) full duplex ((I)BFD) according to the embodiments of the present invention will be described. First of all, the (I)BFD is described in brief. The IBFD means that transmission and reception operations are performed on the same frequency bandwidth. Theoretically, if the IBFD is perfectly implemented, throughput can be doubled compared to the conventional TDD/FDD. However, in the case of the IBFD, since transmission and reception is performed at the same time, impact of interference is significant. Moreover, when the IBFD is implemented, two types of interference, i.e., self-interference and UE-to-UE interference may become problematic. The self-interference means that when a device simultaneously performs transmission and reception, a transmitted signal is received by the device, whereby the signal acts as interference. In the IBFD, the self-interference can be cancelled in a digital or analog manner. In the recent researches (e.g., Dinesh Bharadia, and Sachin Katti, "Full duplex MIMO radios", Ashutosh Sabharwal, Philip Schniter, Dongning Guo, Daniel W. Bliss, Sampath Rangarajan, and Risto Wichman, "In-band full duplex wireless: challenges and opportunities", arxiv 1311.0456v3, Taneli Riihonen, and Risto Wichman, "Analog and digital self interference cancellation in full duplex MIMO OFDM transceivers with limited resolution in A/D conversion", Asilomar conference 2012 and etc.), methods of suppressing self-interference within 3 dB with respect to noise floor have been proposed.

However, if UE-to-UE interference is present even though the self-interference is cancelled, it is impossible to make significant gains. Theoretically, if both of the self-interference and the UE-to-UE interference is cancelled, UL/DL operations can be simultaneously performed without any restrictions. In addition, in this case, if a BS has M antennas, 2M of DoF (degrees of freedom) can be achieved. Most of the recent researches have focused on the self-interference and it has been mentioned that the UE-to-UE interference could be solved by scheduling. However, if the UE-to-UE interference is not solved, it may act as the restriction that a UL UE and a DL UE needs to be located apart from each other for scheduling and thus a scheduling gain may not be obtained. Moreover, considering that the UE-to-UE interference of the IBFD occurs in the same cell, it is critical compared to UE-to-UE interference occurring in TDD-eIMTA.

Accordingly, a method and apparatus for solving the UE-to-UE interference in the IBFD will be described hereinafter in detail.

First of all, in terms of operations of a BS, the BS may receive uplink signals, which are repeated K times, in K time intervals, respectively. While receiving the uplink signals in the K time intervals, the BS may transmit (K-N) downlink signals in (K-N) time intervals. In this case, the N time intervals among the K time intervals can be configured as blank time intervals in which downlink signals are not transmitted. Here, the blank time intervals mean time intervals used for handing interference received by one or more UE that receive the downlink signals from one or more UEs that transmit the uplink signals.

Figure 12:
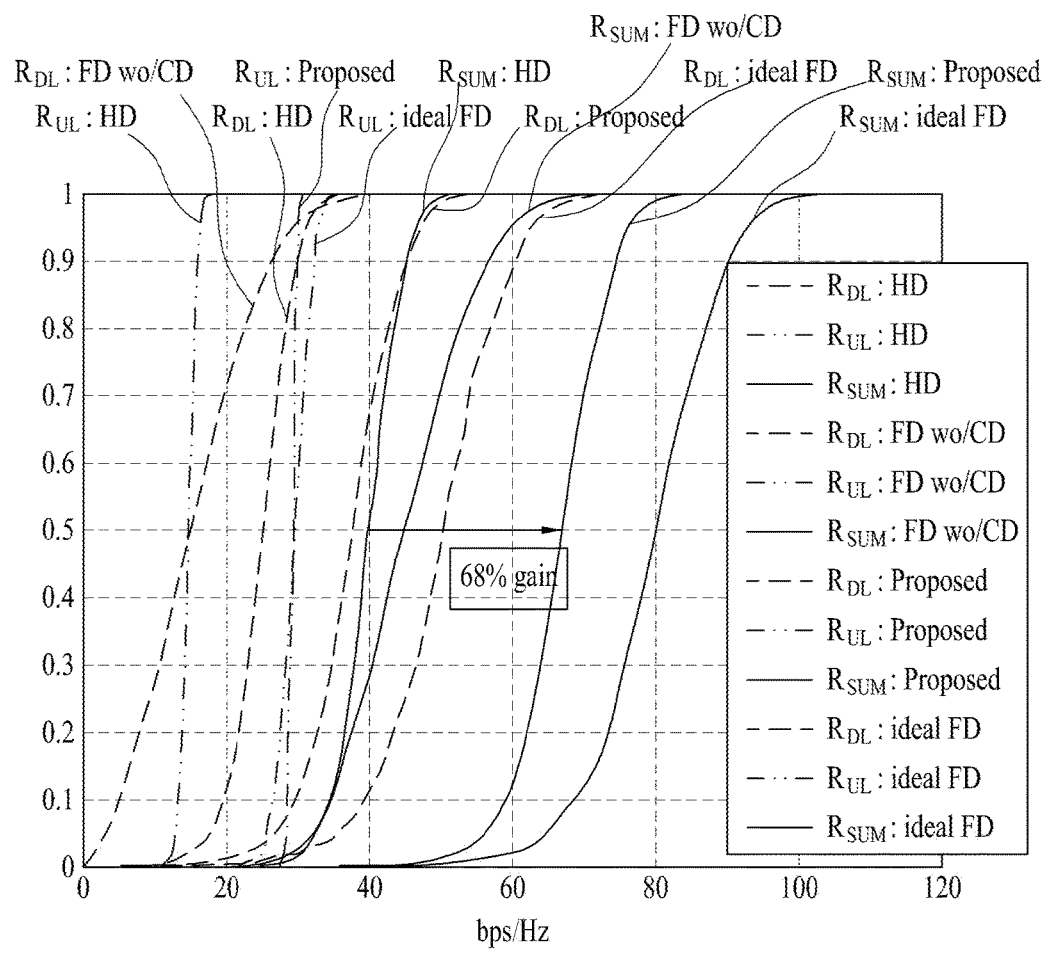
FIGS. 12 and 13 shows results of simulation according to the embodiments of the present invention.

In this case, the interference handling may mean UE-to-UE interference cancellation. In detail, it may mean that the one or more UEs, which receives the downlink signals, eliminates uplink signal components received in the N time intervals when decoding the (K-N) downlink signals. When the uplink signals are repeatedly transmitted in the K time intervals as described above, an uplink transmission rate may be decreased. To prevent this, it is proposed that uplink UEs transmit more streams than the number of maximum streams that the BS can receive during one time interval and the BS decodes all uplink data streams by receiving the same streams through different channels. When the BS receives the uplink signals repeated K times, the channels need to be different in each of the K time intervals in order to enable the BS to decode data streams more than the number of the streams that the BS can receive during one time interval. To this end, i) a different channel may be used in each of the K time intervals, ii) the BS may use a special RF device to intentionally change the channels, or iii) the BS may have a large number of uplink receive antennas enough to increase the number of the streams that the BS can receive in one time interval. Here, the BS may use a reconfigurable antenna device to intentionally change the channels and the reconfigurable antenna means an antenna capable of changing channel states electrically and/or mechanically. For instance, as simple implementation, after installation of a plurality of physical antennas, an operation of switching thereof may be performed. As another implementation, after installation of a number of physical antennas and RF chains, received beam weights may be changed in order to change channel states. FIG. 12 illustrates an example of implementation where each of two antennas has two reconfigurable modes. However, the present invention is not limited to a specific reconfigurable antenna implementation method and, moreover, if a mode of an antenna is changed at a preferred time, it may be referred to as the reconfigurable antenna. When the BS has the reconfigurable antenna and K predetermined antenna modes, the K antenna modes may be respectively applied to the K time intervals. In other words, the BS may receive the K repeated signals through the different channels by changing the antenna modes whenever receiving the uplink signals in the K time intervals. In this case, the BS can assume channel states are not changed in the K time interval. If the channel states are changed in the K time intervals, the N time intervals may be located at the center of the K time intervals. In addition, if the channel states are changed, channels may also be changed while the repeated signals are transmitted. Thus, in this case, it is possible to improve accuracy by locating the N time intervals at the center of the K time intervals. Here, N may be determined according to UE mobility. Alternatively, the N time intervals may be located at the front of the K time intervals in order to facilitate an interference cancellation operation of a receiver. This is because if uplink interference signals are received at the front portion, the BS can perform operations of cancelling the uplink interference signals while receiving the remaining (K-N) signals. Alternatively, the N time intervals may be distributedly located in the K time intervals. This is because to efficiently cancel the interference signals even when the channels are changed.

Meanwhile, instead of the reconfigurable antennas, the BS may have a large number of uplink antennas enough to receive the uplink streams without antenna mode switching. In this case, the base station can decode the repeatedly received signals without separate antenna mode switching.

Figure 8:
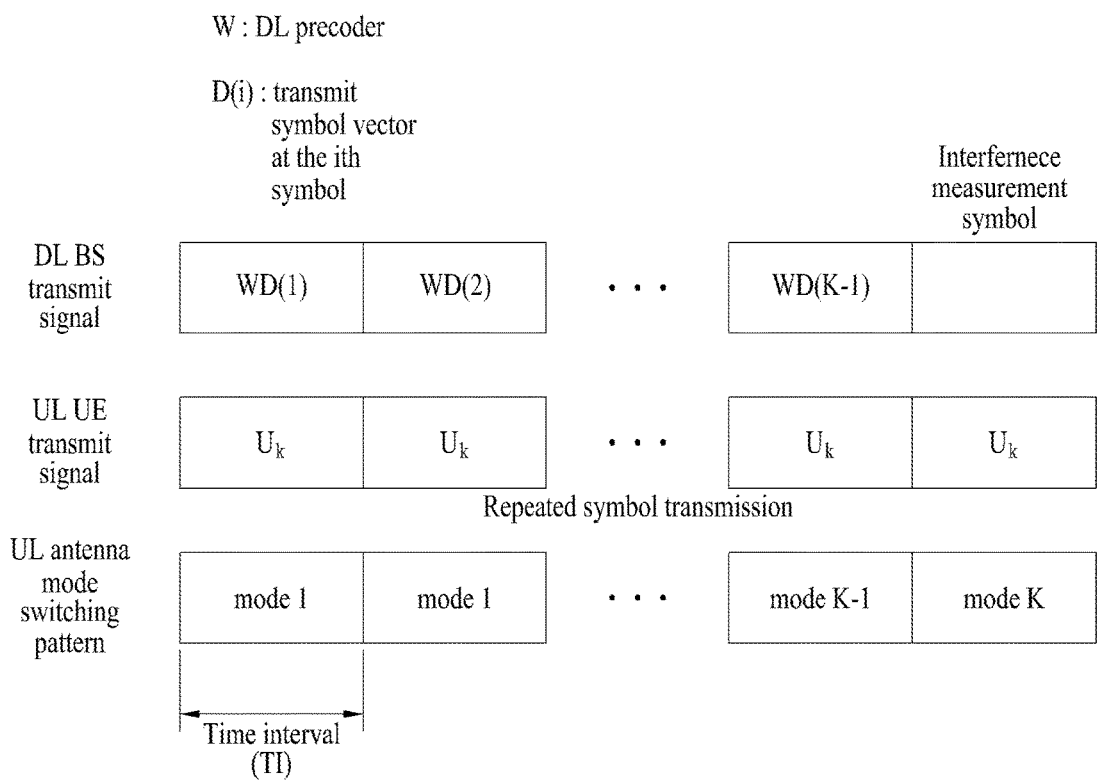
FIGS. 8 to 11 are diagrams for explaining the embodiments of the present invention.

FIG. 8 illustrates an example when N is set to 1 (i.e., N=1) in the aforementioned embodiment. Referring to FIG. 8, a BS can receive, from UL UEs, uplink signals (Uk), which are repeated K times, in K time intervals (TI). As described above, an antenna mode is changed in each of the K time intervals. While receiving the signals in the K time intervals from the UL UEs, the BS transmits DL signals (i.e., WD(1), WD(2), . . . , WD(K-1)) at the same time. That is, the signal transmission and reception procedure is summarized as follows. The number NU of UL UEs may repeatedly transmit their transmission symbols in K symbols and the BS may perform reception by switching modes of its UL reconfigurable antenna K times. While UL transmission and reception is performed, the BS may transmit the DL signals (K-1) times. In this case, the BS may not perform transmission in the remaining one time interval among the K time intervals. In addition, UEs that receive the DL signals may receive interference signals in the remaining one time interval and use the received interference signals in cancelling UE-to-UE interference.

Figure 9:
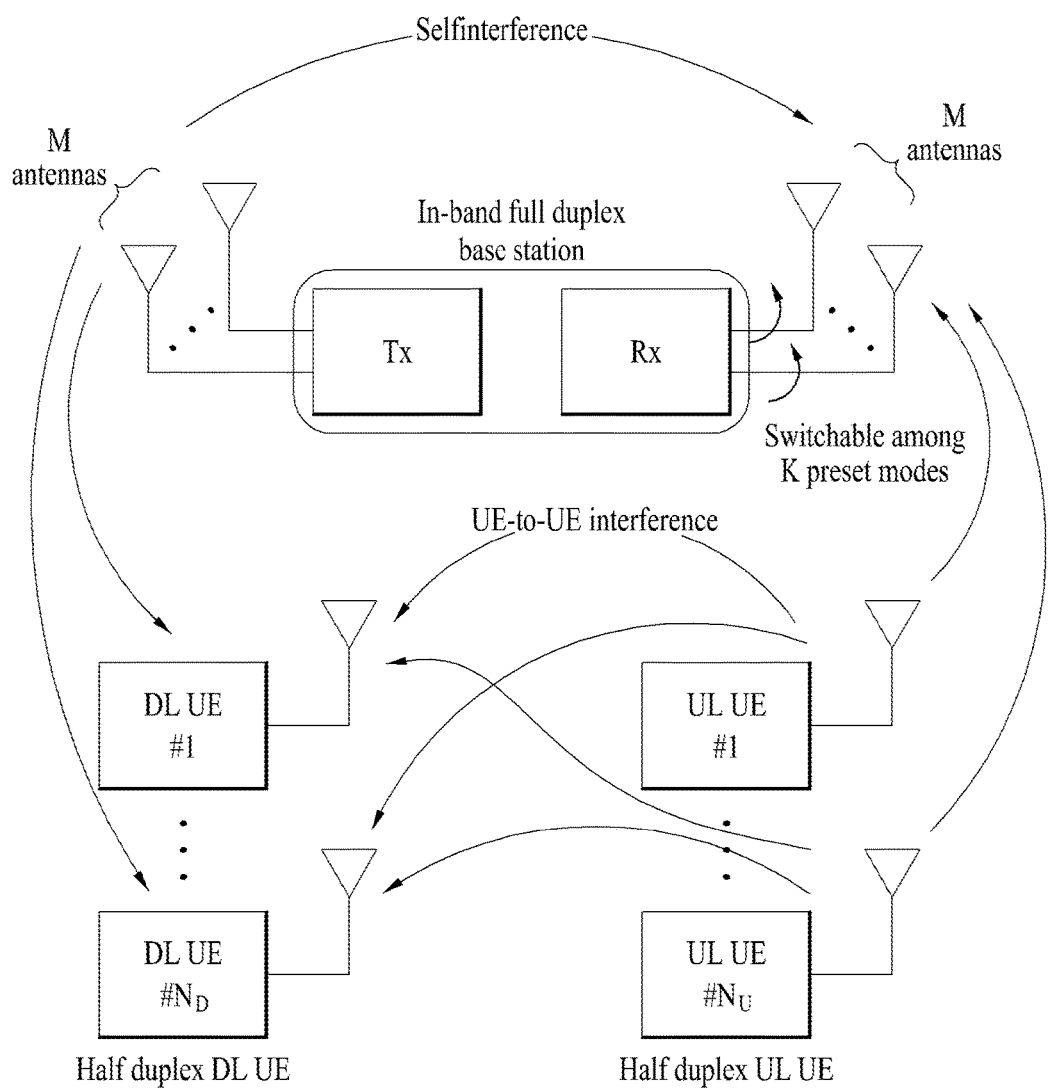
Figure 10:
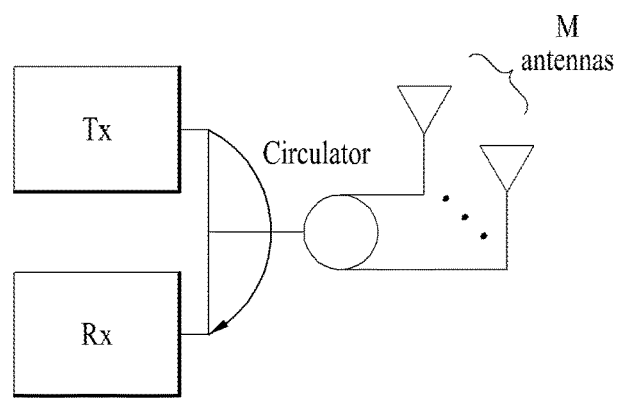
Figure 11:
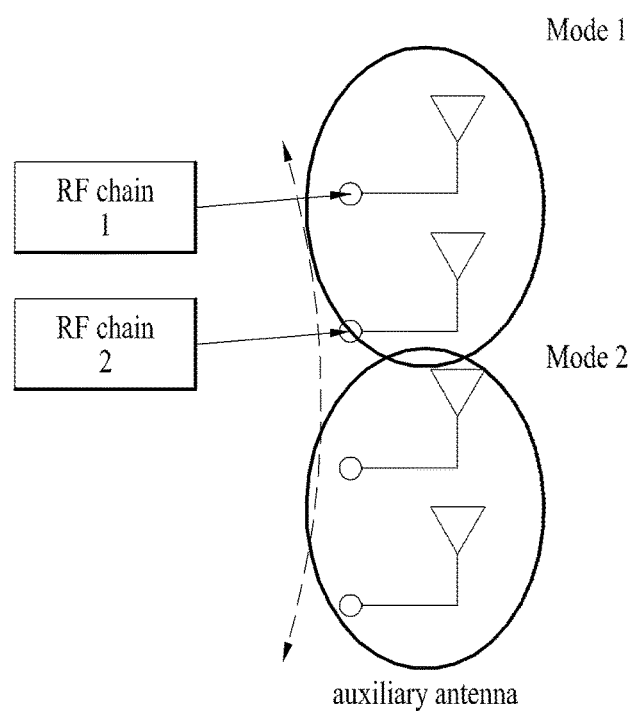

FIG. 9 illustrates a system model according to an embodiment of the present invention. In FIG. 9, it is premised that a BS has M Tx antennas and M Rx antennas, a UE has one Tx antenna, and the number of predetermined antenna modes is K. That is, it is assumed that each UL antenna has K modes and a channel status is independent from switching between the modes. Moreover, it is also assumed that channels are static while K symbols are transmitted. Although FIG. 9 shows an example of a separated antenna IBFD type BS in which a UL RX antenna is separated from a DL TX antenna, a BS may be a shared antenna IBFD type, which is illustrated in FIG. 10, where an antenna is shared between DL and UL but a DL antenna is separated from a UL antenna using a circulator. Further, the antennas shown in FIG. 9 may be reconfigurable.

In the situation illustrated in FIG. 9, DL signals can be expressed as shown in Equation 12.

$$y_k^D = h_k^T w_k d_k + \underbrace{\sum_{j \neq k, j=1}^{N_D} h_k^T w_j d_j}_{MU\text{-}MIMO\ interference} + \underbrace{\sum_{l=1}^{N_U} g_{k,l} u_l}_{UE\text{-}to\text{-}UE\ interference} + z_k, k = 1, \ldots, N_D \quad [\text{Equation 12}]$$

In addition, UL signals transmitted by UL UEs can be expressed as shown in Equation 13.

$$Y^U(i) = \sum_{k=1}^{N_U} r_k(i) u_k + \underbrace{\sum_{j=1}^{N_D} T w_j d_j}_{Self\ interference} + Q(i) \quad [\text{Equation 13}]$$

In Equations 12 and 13, $h_k^T$ indicates an 1×M DL channel matrix from the BS to an $k^{th}$ UE, $w_k$ indicates an M×1 precoding matrix for the $k^{th}$ UE, $d_k$ indicates a transmission symbol of an $k^{th}$ user, $g_{k,l}$ indicates an 1×1 channel from an $l^{th}$ UL UE to an $k^{th}$ DL UE, $z_k$ indicates a noise signal of the $k^{th}$ user, $N_D$ indicates the number of users that are simultaneously supported in DL, $N_U$ indicates the number of users that are simultaneously supported in UL, $r_k(i)$ indicates an M×1 UL channel matrix from the $k^{th}$ UE to the BS in an $i^{th}$ antenna mode, $u_k$ indicates a transmission symbol of the $k^{th}$ UE, T indicates an M×M self-interference channel from a DL antenna to a UL antenna, and Q indicates an M×1 reception noise signal of the BS.

The UL signals received by the BS can be expressed as shown in Equation 14.

$$Y^U(i) = \qquad \text{[Equation 14]}$$

$$\underbrace{[r_1(i) \; r_2(i) \; \ldots \; r_k(i)]}_{R(i)} \underbrace{\begin{bmatrix} u_1 \\ u_2 \\ \vdots \\ u_{N_U} \end{bmatrix}}_{=U} + \underbrace{\sum_{j=1}^{N_D} Tw_j d_j}_{=0} + Q(i) =$$

$$R(i)U + Q(i)$$

In this case, if the BS receives repeated signals by switching antenna modes K times, the received signals can be expressed as shown in Equation 15.

$$\underbrace{\begin{bmatrix} Y^U(1) \\ Y^U(2) \\ \vdots \\ Y^U(K) \end{bmatrix}}_{MK \times 1} = \underbrace{\begin{bmatrix} R(1) \\ R(2) \\ \vdots \\ R(K) \end{bmatrix}}_{MK \times N_U} \underbrace{U}_{N_U \times 1} + \begin{bmatrix} Q(1) \\ Q(2) \\ \vdots \\ Q(K) \end{bmatrix} \qquad \text{[Equation 15]}$$

In Equation 15, NU can perform transmission up to MK times at the same time and MK UL UEs simultaneously perform transmission K times.

The BS transmits DL signals while receiving the UL signals. The DL signals transmitted in K time intervals can be expressed as shown in Equation 16.

$$y_k^D(1) = h_k^T w_k d_k(1) + \sum_{l=1}^{N_U} g_{k,l} u_l(1) + z_k(1), \qquad \text{[Equation 16]}$$

$$\vdots$$

$$y_k^D(K-1) =$$

$$h_k^T w_k d_k(K-1) + \sum_{l=1}^{N_U} g_{k,l} u_l(K-1) + z_k(K-1),$$

$$y_k^D(K) = \sum_{l=1}^{N_U} g_{k,l} u_l(K) + z_k(K).$$

In this case, UE-to-UE interference can be perfectly cancelled by subtracting the last received signal from each of the first received symbol and an $(K-1)^{th}$ received symbol. This can be expressed as shown in Equation 17.

$$y_k^D(1) - y_k^D(K) = h_k^T w_k d_k(1) + z_k(1), \qquad \text{[Equation 17]}$$

$$\vdots$$

$$y_k^D(K-1) - y_k^D(K) = h_k^T w_k d_k(K-1) + z_k(K-1).$$

That is, in terms of operations of UEs that receive the aforementioned (K-N) DL signals, in case N=1, the DL signals can be expressed as shown in Equation 18. In addition, in this case, the above-described interference handling can be expressed as shown in Equation 19.

$$y_k^D(n) = h_k^T w_k d_k(n) + \sum_{l=1}^{N_u} g_{k,l} u_l(n) + z_k(n), \; 1 \le n \le K-1 \qquad \text{[Equation 18]}$$

$$y_k^D(n) = h_k^T w_k d_k(n) + \sum_{l=1}^{N_u} g_{k,l} u_l(n) + z_k(n) - \sum_{l=1}^{N_u} g_{k,l} u_l(K), \qquad \text{[Equation 19]}$$

$$1 \le n \le K-1$$

The DoF, which can be achieved in the IBFD BS system, may be obtained through DL M(K−1) and UL MK during a total of K symbol intervals and the sum of UL/DL DoF can be represented as Equation 20.

$$d_{sum} = \frac{(K-1)M + KM}{K} = \frac{(2K-1)M}{K} \qquad \text{[Equation 20]}$$

In Equation 20, if the number of modes of the reconfigurable antenna, K goes to infinity, 2M of DoF can be approximately achieved. In other words, if an uplink antenna has infinite modes and there are infinite UL UEs, it is possible to approximately obtain a gain of in-band full duplex operation in an ideal environment.

Although the present invention is described based on the assumption that a UE has a single transmit and receive antenna, the present invention can be extensively applied to a case in which a UE has multiple transmit and receive antennas. In case a UE has multiple transmit and receive antennas and a rank per UE is referred to as $r_k$, it needs to satisfy the condition of $$\sum_{k=1}^{N_U} r_k \le MK.$$

The aforementioned proposal of the present invention can be explained as the following embodiment. Assume that a BS has two transmit and receive antennas and each of the two transmit and receive antennas corresponds to a reconfigurable antenna capable of switching between two modes. In this case, if a DL UE has a single antenna, it is possible to assume that a total of two DL UEs are simultaneously scheduled through MU-MIMO. If a DL UE has two antennas, it is possible to assume that only one DL UE is scheduled. Assuming that a UL UE has a single transmit antenna, a total of four UEs are scheduled and the four UEs repeatedly transmit the same symbol during two symbol intervals at the same time. Assuming that a UL UE has two transmit antennas, two UEs transmit symbols in accordance with rank 2.

Moreover, the present invention can be applied to the legacy cellular system. In this case, a traffic rate in DL may be different from that in UL. In a normal cellular system, the DL traffic rate is set to be higher than the UL traffic rate. Thus, in this case, it is not necessary to perform the full duplex operation on all subframes. When the principle described in the present invention is applied to the conventional TDD configuration, the TDD configuration may be configured with DL, full duplex, and special subframes instead of existing DL, UL, and special subframes. Table 1a shows the conventional TDD configuration of the LTE system and Table 1 shows the proposed configuration. In Table 1, 'F' denotes full duplex. In this case, only a UL mode except a full duplex mode may be serviced in UpPTS of a special subframe exceptionally.

TABLE 1

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | F | F | F | D | S | F | F | F |
| 1 | 5 ms | D | S | F | F | D | D | S | F | F | D |
| 2 | 5 ms | D | S | F | D | D | D | S | F | D | D |
| 3 | 10 ms | D | S | F | F | F | D | D | D | D | D |
| 4 | 10 ms | D | S | F | F | D | D | D | D | D | D |
| 5 | 10 ms | D | S | F | D | D | D | D | D | D | D |
| 6 | 5 ms | D | S | F | F | F | D | S | F | F | D |

In the proposed method, the repetition may be performed in an OFDM symbol level or a group level including a plurality of OFDM symbols. Alternatively, when the reconfigurable antenna is implemented by receive post-coding (i.e., change in a beam weight of a receiver), the repetition may be performed on a basis of an RE (i.e., subcarrier) in one OFDM symbol. For instance, when the transmission and reception pattern shown in FIG. 6 is performed in the OFDM symbol level, a UL UE repeatedly transmits the same symbol K times. Alternatively, when transmission is performed in the RE level, the UL UE repeatedly transmits the same symbol in K REs. In this case, the UL UE does not perform transmission on one DL symbol (or RE) but use the one DL symbol in estimating an interference signal or cancelling the interference signal in other symbols (or REs). If the corresponding symbol is reserved for transmitting important control information or a pilot signal, the UL UE should not perform muting on the symbol. Therefore, it is proposed that the UL UE performs DL muting on a symbol (or RE) in which the control information or pilot signal is not transmitted. For instance, it is proposed that a symbol (or RE) for transmitting a PDCCH or a CRS is excluded from muting symbols. In addition, when the IBFD operation is performed on only the subframe which is originally used for UL as shown in Table 1b, it is proposed not to transmit all or a part of the PDCCH, the CRS, or a synchronization signal in the corresponding subframe. When the proposed transmitting and receiving method is performed in a subframe level, transmission should be stopped in one DL subframe and the one DL subframe should be used for interference measurement. In this case, a network performs blanking on the corresponding subframe and DL UEs receives signals without any changes and then use the subframe for interference measurement.

The present invention has advantages in that a BS does not need to limit scheduling for cancelling or mitigating UE-to-UE interference and operations of transmitting and receiving pilot signals for UE-to-UE interference channel estimation and interference cancellation are not necessary. In addition, a UE does not need to include an interference controller or an interference cancellation receiver to cancel or mitigate the UE-to-UE interference. Moreover, considering that half subcarrier shifting between UL and DL is currently applied to the LTE system, the present invention has also an advantage in that it can be applied to a case in which a location of a UL subcarrier is different from that of a DL subcarrier without any limitation.

According to the principle of the present invention, UEs that intend to perform UL transmission repeatedly transmit the same signal several times, a BS omits one-time transmission while repeating transmission, and DL UEs receive repeatedly transmitted interference signals and then use the received signals for cancelling interference in symbols for data transmission. When UL signals are repeatedly transmitted, UEs greater than the number of UL antennas simultaneously perform transmission in order to reduce UL throughput loss. The BS can perform decoding by receiving the repeatedly transmitted signals through different channels using reconfigurable antennas.

Figure 13:
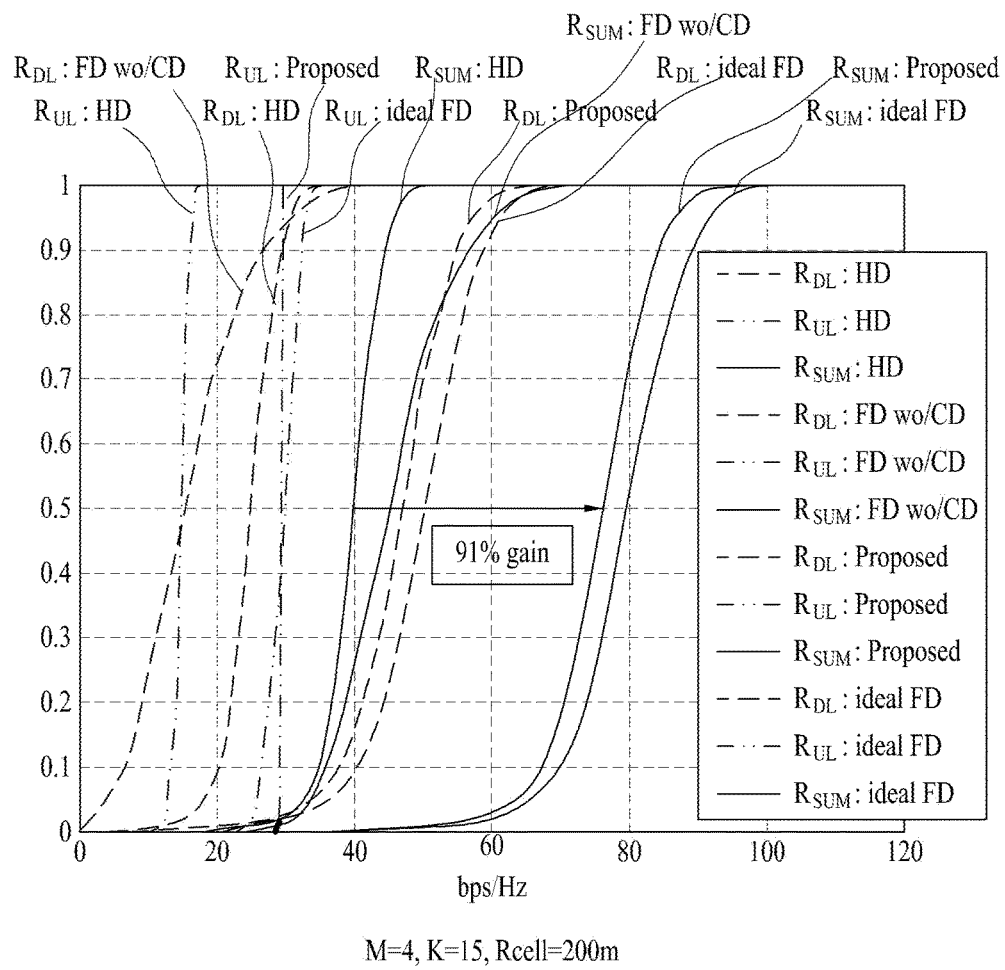

FIGS. 12 and 13 shows simulation results according to the embodiments of the present invention to compare simulation result to which the embodiments are not applied. In the simulation, it is assumed that there are four UL antennas and four DL antennas, a cell radius is 200 m, a path-loss exponent of a channel is four, and a noise power is −100 dBm. In addition, it is also assumed that UL/DL UEs are randomly dropped in a circle with the radius of 200 ms, a maximum transmit power of a BS is 30 dBm, an open-loop power control method is used for UL power control (P0=−80 dBm, a fractional path-loss compensation factor (referred to as α)=1), and a maximum transmit power of a UE is 23 dBm.

For the comparison with the proposed method, the conventional half duplex method, a full duplex method to which an interference control scheme is not applied between UL/DL UEs, and a full duplex method in an ideal environment (i.e., a case in which UE-to-UE interference is set to 0 in the simulation) are simulated together. In the conventional half duplex method, 1:1 UL/DL resource ratio is considered. In all other methods except the proposed method, it is assumed that M UL UEs are randomly scheduled, whereas in the proposed method, it is assumed that MK UL UEs are simultaneously scheduled and then the UEs repeatedly transmit the same symbol in K time intervals. Since repetition coding is used in the proposed method, a transmit power is set to 1/K to fairly compare the proposed method with other methods.

Particularly, FIGS. 12 and 13 shows comparison of throughput performance (bps/Hz). In the graphs, $R_{UL}$ indicates UL throughput, $R_{sum}$ indicates a sum of UL throughput and DL throughput, HD indicates the half duplex method, FD indicates the full duplex method, FD wo/CD indicates IBFD without coordination, ideal FD indicates ideal IBFD, and 'proposed' indicates a case in which the method according to the embodiments of the present invention is applied. In the IBFD, the method without UL/DL coordination has performance degradation due to severe UE-to-UE interference whereas the proposed method has gains of 68% (in case of K=4 shown in FIGS. 12) and 91% (in case of K=15 shown in FIG. 13) compared to the half duplex method. In particular, as K increases, a performance gain increases, whereby ideal IBFD performance can be achieved. For instance, according to the conventional LTE system, one subframe includes 14 symbols. When the proposed method is applied to each of the 14 symbols (i.e., 15 symbol extensions are considered in the simulation environment), it is expected to obtain almost ideal IBFD performance gain (about 90% gain of the half duplex).

Device Configuration According to Embodiments of the Present Invention

Figure 14:
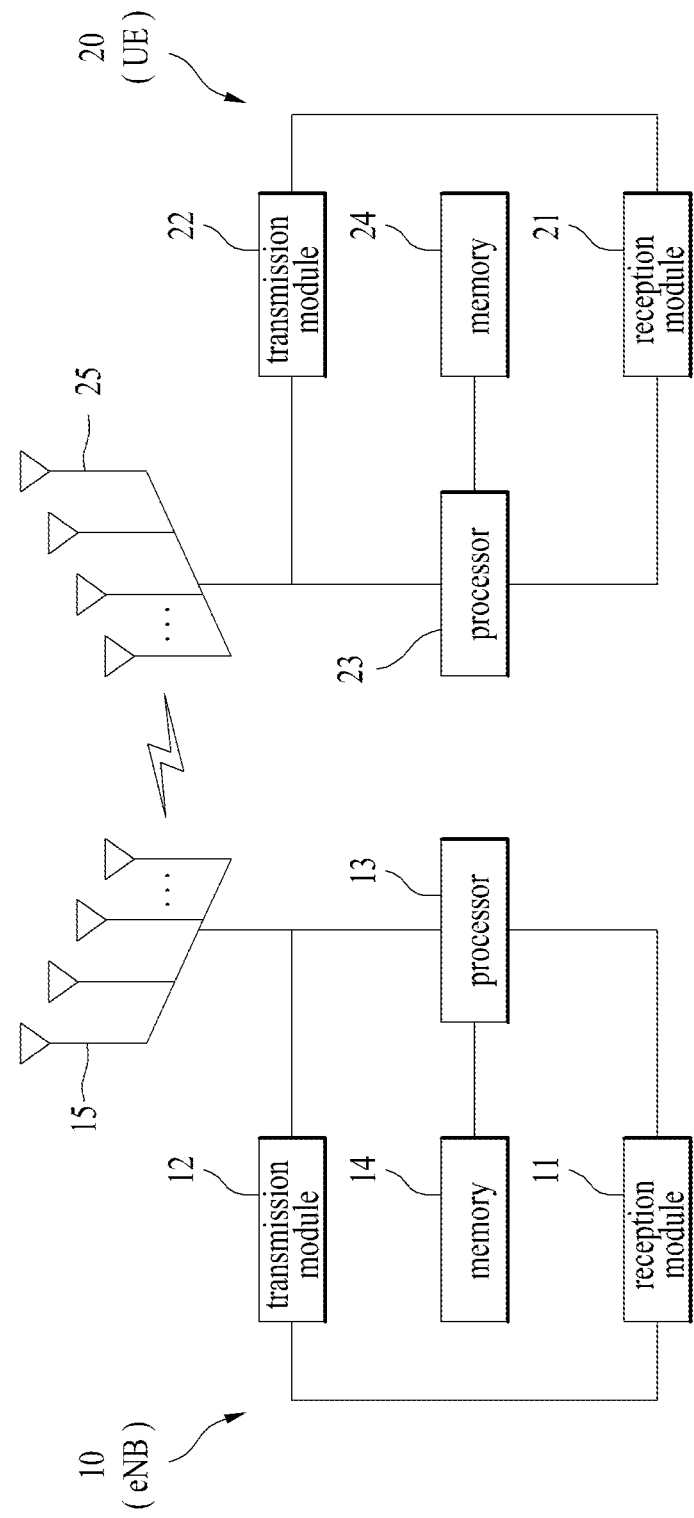
FIG. 14 is a block diagram illustrating configurations of transmitting and receiving devices.

FIG. 14 is a diagram illustrating configurations of a transmission point device and a user equipment device according to embodiments of the present invention.

Referring to FIG. 14, a transmission point device 10 according to the present invention may include a receiving module 11, a transmitting module 12, a processor 13, a memory 14 and a plurality of antennas 15. The plurality of the antennas 15 may mean that the transmission point device supports MIMO transmission and reception. The receiving module 11 can receive various signals, data and information in uplink from a user equipment. The transmitting module 12 can transmit various signals, data and information in downlink to the user equipment. And, the processor 13 can control overall operations of the transmission point device 10.

The processor 13 of the transmission point device 10 according to one embodiment of the present invention can handle the details required in each of the embodiments mentioned in the foregoing description.

The processor 13 of the transmission point device 10 performs functions of operating and processing information received by the transmission point device 10, information to be externally transmitted by the transmission point device 10, and the like. The memory 14 can store the operated and processed information and the like for a prescribed period and can be substituted with such a component as a buffer (not shown in the drawing) and the like.

Referring to FIG. 14, a user equipment device 20 according to the present invention may include a receiving module 21, a transmitting module 22, a processor 23, a memory 24 and a plurality of antennas 25. The plurality of the antennas 15 may mean that the transmission point device supports MIMO transmission and reception. The receiving module 21 can receive various signals, data and information in downlink from an eNB. The transmitting module 22 can transmit various signals, data and information in uplink to the eNB. And, the processor 23 can control overall operations of the user equipment device 20.

The processor 23 of the user equipment device 20 according to one embodiment of the present invention can handle the details required in each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The detailed configurations of the transmission point device 10 and the user equipment device 20 can be implemented such that the details explained with reference to various embodiments of the present invention are independently applied or two or more embodiments of the present invention are simultaneously applied. And, redundant description shall be omitted for clarity.

The description of the transmission point device 10 in FIG. 14 may be equally applied to a relay node device as a downlink transmission entity or an uplink reception entity. And, the description of the user equipment device 20 in FIG. 14 may be equally applied to a relay node device as a downlink reception entity or an uplink transmission entity.

The embodiments of the present invention mentioned in the foregoing description can be implemented using various means. For instance, the embodiments of the present invention can be implemented using hardware, firmware, software and/or any combinations thereof.

In the case of implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In the case of implementation by firmware or software, a method according to each of the embodiments of the present invention can be implemented by modules, procedures, and/or functions for performing the above-explained functions or operations. The software code is stored in a memory unit and can be driven by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The above-described embodiments of the present invention can be applied to various kinds of mobile communication systems.

What is claimed is:
1. A method of transmitting and receiving signals by an IBFD (inband full duplex) base station in a wireless communication system, the method comprising:
receiving uplink signals, which are repeated K times, in K time intervals, respectively; and
transmitting (K-N) downlink signals in (K-N) time intervals while receiving the uplink signals in the K time intervals,
wherein among the K time intervals, the N time intervals are used for cancelling an interference, which one or more user equipments that transmit the uplink signals cause to one or more user equipments that receive the downlink signals, and
wherein the cancelling of the interference is performed in such a manner that the one or more user equipments that receive the downlink signals eliminate signal components received in the N time intervals when decoding the (K-N) downlink signals.

2. The method of claim 1, wherein in case N=1 and the downlink signals are expressed as follows:

$$y_k^D(n) = h_k^T w_k d_k(n) + \sum_{l=1}^{Nu} g_{k,l} u_l(n) + z_k(n), 1 \le n \le K-1,$$

the cancelling of the interference is expressed as follows:

$$y_k^D(n) = h_k^T w_k d_k(n) + \sum_{l=1}^{Nu} g_{k,l} u_l(n) + z_k(n) - \sum_{l=1}^{Nu} g_{k,l} u_l(K),$$

$$1 \le n \le K-1,$$

where $h_k^T$ indicates an 1×M downlink channel matrix from the base station to an $k^{th}$ user equipment, $w_k$ indicates an M×1 precoding matrix for the $k^{th}$ user equipment, $d_k$ indicates a transmission symbol of an $k^{th}$ user, $g_{k,l}$ indicates an 1×1 channel from an $l^{th}$ uplink signal transmission user equipment to an $k^{th}$ downlink signal reception user equipment, $z_k$ indicates a noise signal of the $k^{th}$ user equipment, $N_D$ indicates the number of users that are simultaneously supported in downlink, and $N_U$ indicates the number of users that are simultaneously supported in uplink.

3. The method of claim 1, wherein when the uplink signals repeated K times are received, a different channel is used in each of the K time intervals.

4. The method of claim 1, wherein when the base station has K predetermined antenna modes, the K predetermined antenna modes are respectively applied to the K time intervals.

5. The method of claim 1, wherein the base station assumes that channel states are not changed in the K time intervals.

6. The method of claim 1, wherein when channel states are changed in the K time intervals, the N time intervals are located at a center of the K time intervals.

7. The method of claim 1, wherein the N time intervals are located at an end of the K time intervals.

8. The method of claim 1, wherein the time interval corresponds to any one of an OFDM symbol, a slot, and a subframe.

9. The method of claim 1, wherein the number of the user equipments that receive the downlink signals is K.

10. The method of claim 1, wherein the base station comprises a reconfigurable antenna.

11. A base station apparatus in a wireless communication system, the base station comprising:
a receiver; and
a processor configured to control the receiver,
wherein the processor is configured to respectively receive uplink signals repeated K times in K time intervals and transmit (K-N) downlink signals in (K-N) time intervals while receiving the uplink signals in the K time intervals, and
wherein among the K time intervals, the N time intervals are used for cancelling an interference, which one or more user equipments that transmit the uplink signals cause to one or more user equipments that receive the downlink signals, and
wherein the cancelling of the interference is performed in such a manner that the one or more user equipments that receive the downlink signals eliminate signal components received in the N time intervals when decoding the (K-N) downlink signals.

* * * * *